United States Patent
Bae et al.

(10) Patent No.: US 7,642,737 B2
(45) Date of Patent: Jan. 5, 2010

(54) ANTI-WINDUP CONTROL FOR A CURRENT REGULATOR OF A PULSE WIDTH MODULATION INVERTER

(75) Inventors: Bonho Bae, Torrance, CA (US); Steven E. Schulz, Torrance, CA (US); Silva Hiti, Redondo Beach, CA (US); Nitinkumar R. Patel, Cypress, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 322 days.

(21) Appl. No.: 11/685,729

(22) Filed: Mar. 13, 2007

(65) Prior Publication Data

US 2008/0224649 A1    Sep. 18, 2008

(51) Int. Cl.
*H02P 21/00* (2006.01)
(52) U.S. Cl. .............. 318/400.02; 318/727; 318/801
(58) Field of Classification Search .......... 318/400.01, 318/400.02, 800, 808, 712, 720, 727, 801, 318/807
See application file for complete search history.

(56) References Cited

U.S. PATENT DOCUMENTS

| | | | | |
|---|---|---|---|---|
| 5,717,305 | A * | 2/1998 | Seibel et al. | 318/778 |
| 6,163,128 | A * | 12/2000 | Hiti et al. | 318/722 |
| 6,636,012 | B2 * | 10/2003 | Royak et al. | 318/727 |
| 6,763,622 | B2 * | 7/2004 | Schulz et al. | 318/700 |
| 6,819,077 | B1 * | 11/2004 | Seibel et al. | 318/801 |
| 6,861,813 | B2 * | 3/2005 | Yoshimoto et al. | 318/432 |
| 6,924,617 | B2 * | 8/2005 | Schulz et al. | 318/701 |
| 6,982,533 | B2 * | 1/2006 | Seibel et al. | 318/432 |
| 7,023,168 | B1 * | 4/2006 | Patel et al. | 318/757 |
| 7,034,493 | B2 * | 4/2006 | Yoshimoto et al. | 318/629 |
| 7,095,209 | B2 * | 8/2006 | Thunes et al. | 318/825 |
| 7,211,984 | B2 * | 5/2007 | Patel et al. | 318/778 |
| 7,242,163 | B2 * | 7/2007 | Gallegos-Lopez et al. | 318/812 |
| 7,332,837 | B2 * | 2/2008 | Ward et al. | 310/54 |
| 7,449,859 | B2 * | 11/2008 | Bae et al. | 318/807 |
| 2002/0041171 | A1 * | 4/2002 | Cho | 318/727 |
| 2004/0232862 | A1 * | 11/2004 | Wogari et al. | 318/254 |
| 2005/0151502 | A1 * | 7/2005 | Quirion | 318/715 |

\* cited by examiner

*Primary Examiner*—Bentsu Ro
*Assistant Examiner*—Antony M Paul (57) ABSTRACT

A control architecture for an electrical inverter includes a command limiter that is realized as a circular voltage limiter. The command limiter includes a Cartesian-to-polar converter coupled to a command source such as a synchronous frame current regulator. The Cartesian-to-polar converter provides magnitude and phase components for d-q command voltages. The command limiter further includes a magnitude limiter that limits the magnitude component to the maximum fundamental voltage component of the inverter, and a polar-to-Cartesian converter that converts the limited magnitude component and the phase component into modified d-q command voltages.

18 Claims, 4 Drawing Sheets

ANTI-WINDUP CONTROL FOR A CURRENT REGULATOR OF A PULSE WIDTH MODULATION INVERTER

TECHNICAL FIELD

Embodiments of the present invention generally relate to controllers for electric motors, and more particularly relate to an anti-windup control scheme for a current regulator of a pulse width modulation inverter suitable for use with an electric motor.

BACKGROUND

Figure 1:
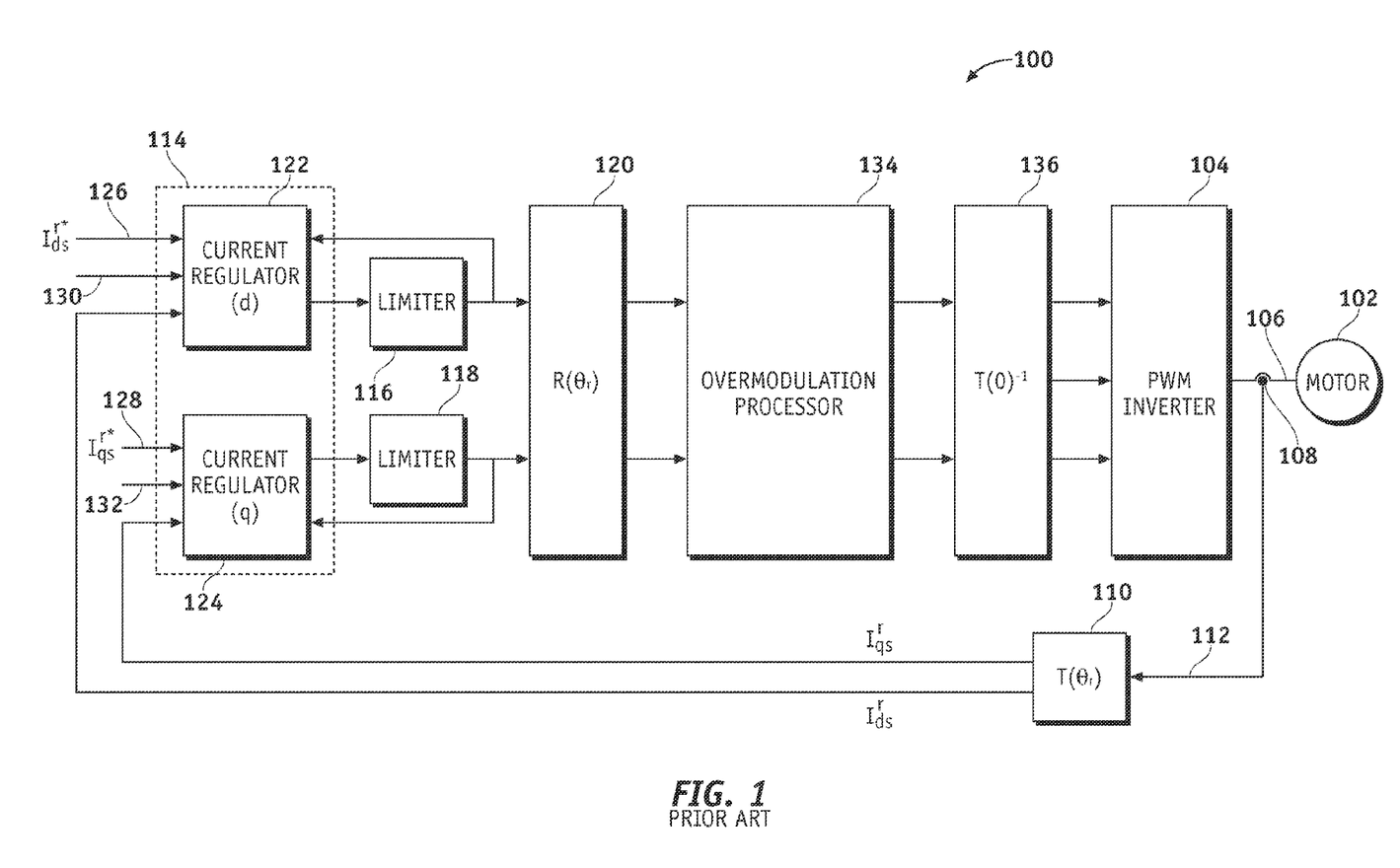
FIG. 1 is a schematic representation of a known anti-windup architecture using conventional command limiters.

An electric traction drive, such as may be used in an electric or hybrid vehicle, requires high voltage utilization to produce torque as efficiently as possible within a constrained volume and weight. For such high voltage utilization, an electric drive system may operate with an overmodulation processor for a pulse width modulator (PWM) that includes a six-step mode (described below). FIG. 1 is a schematic representation of a known current regulator and control architecture 100 for a multiphase AC motor 102.

Architecture 100 includes a PWM inverter 104 that drives AC motor 102 over a connection arrangement 106, which may include any number of connection lines. The number of connections represented by connection arrangement 106 is defined by the number of phases used in AC motor 102. For example, a three-phase AC motor 102 would have three connection lines. Connection arrangement 106 may include or be coupled to current sensors 108. The number of current sensors 108 is again defined by the number of phases used in AC motor 102. The outputs of current sensors 108 are coupled to a transformation processor 110 using connection lines 112. The number of connection lines 112 is again defined by the number of phases used in AC motor 102, in this example, three.

The three phase currents ($i_{as}$, $i_{bs}$, and $i_{cs}$) that are measured by current sensors 108 typically carry sinusoidal current waveforms when viewed in a reference frame synchronous with the stator of the AC motor 102, the stationary frame. In transformation processor 110, these three phase currents are transformed into the synchronous d-q frame using equation (1) as follows:

$$\begin{bmatrix} i_{ds}^r \\ i_{qs}^r \end{bmatrix} = T(\theta_r) \begin{bmatrix} i_{as} \\ i_{bs} \\ i_{cs} \end{bmatrix} = \frac{2}{3} \begin{bmatrix} \cos(\theta_r) & \cos(\theta_r - \frac{2}{3}\pi) & \cos(\theta_r + \frac{2}{3}\pi) \\ -\sin(\theta_r) & -\sin(\theta_r - \frac{2}{3}\pi) & -\sin(\theta_r + \frac{2}{3}\pi) \end{bmatrix} \begin{bmatrix} i_{as} \\ i_{bs} \\ i_{cs} \end{bmatrix} \quad (1)$$

In equation (1), the rotor angle $\theta_r$ is the electrical rotor position calculated from the mechanical rotor position and the motor pole number. The rotor angle $\theta_r$ is measured by a sensor (not shown). The d-q frame of reference, in Cartesian coordinates, is synchronous with the rotation of the electrical rotor position $\theta_r$.

As used herein, the meaning of subscription and superscription is as follows.

Subscript a, b, and c: Quantity in the phase a, b, and c.
Subscript d and q: Quantity in the d-q frame.
Subscript s: Quantity of stator windings.
Superscript s: Quantity in the stationary frame.
Superscript r: Quantity in the rotating (synchronous) frame.
Superscript *: Quantity which is commanded.

The signals are referenced to the d-q reference frame as the signals are processed through a synchronous frame current regulator 114 and through command voltage limiters 116/118, and the processed signals are reconverted into a stator reference frame in a rotational transformation processor 120.

The outputs of transformation processor 110 are the measured d-q currents $i_{ds}^r$ and $i_{qs}^r$ as depicted in FIG. 1. The measured d-q currents ($i_{ds}^r$ and $i_{qs}^r$) are coupled to synchronous frame current regulator 114. In particular, the measured d current ($i_{ds}^r$) is coupled to the d proportional integrating (PI) regulator 122, and the measured q current ($i_{qs}^r$) is coupled to the q PI regulator 124. In addition, commanded d-q currents ($i_{ds}^{r*}$ and $i_{qs}^{r*}$) are coupled to respective d and q PI regulators 122/124 over respective connection lines 126/128 from a higher level controller (e.g., a torque or a speed controller). Clamped voltage commands ($V_{ds\_out}^{r*}$ and $V_{qs\_out}^{r*}$) output from the respective command voltage limiters 116/118 are fed back into respective d and q PI regulators 122/124.

Feed forward voltages ($V_{ds\_FF}^r$ and $V_{qs\_FF}^r$) are provided to respective d and q PI regulators 122/124 over respective connection lines 130/132. These feed forward voltages are typically provided by the current controller, speed controller, or torque controller based on the motor speed, motor parameters and the currents drawn by the motor. The command output voltages of d and q PI regulators 122/124 are coupled to command voltage limiters 116/118, discussed below with respect to FIG. 3.

The clamped voltage commands ($V_{ds\_out}^{r*}$ and $V_{qs\_out}^{r*}$) output from command voltage limiters 116/118 are coupled to rotational transformation processor 120 to transform the voltage in the synchronous frame to the voltage in a stationary frame in which the command voltages rotate as follows.

$$\begin{bmatrix} v_{ds\_out}^{s*} \\ v_{qs\_out}^{s*} \end{bmatrix} = R(\theta_r) \begin{bmatrix} v_{ds\_out}^{r*} \\ v_{qs\_out}^{r*} \end{bmatrix} = \begin{bmatrix} \cos(\theta_r) & -\sin(\theta_r) \\ \sin(\theta_r) & \cos(\theta_r) \end{bmatrix} \begin{bmatrix} v_{ds\_out}^{r*} \\ v_{qs\_out}^{r*} \end{bmatrix} \quad (2)$$

The d and q outputs from rotational transformation processor 120 are coupled to an overmodulation processor 134 (a processor that includes six step mode). The rotated voltage command ($V_{ds\_out}^{s*}$ and $V_{qs\_out}^{s*}$), which rotates in the stationary reference frame, is processed by the overmodulation processor 134. If the magnitude of the command voltage ($V_{ds\_out}^{s*}$ and $V_{qs\_out}^{s*}$) is less than $$\frac{1}{\sqrt{3}} V_{dc},$$

which is the maximum voltage of linear space vector PWM, the voltage is not modified by overmodulation processor 134. If the magnitude is larger than $$\frac{1}{\sqrt{3}} V_{dc},$$

the inverter cannot realize the commanded phase and magnitude of the voltage due to the physical limitation of the inverter. In that case, overmodulation processor 134 modifies the phase and/or magnitude of the clamped output voltage into the modified voltage ($V_{ds\_ov}^{s*}$ and $V_{qs\_ov}^{s*}$), whose fundamental component magnitude and phase matches with those of the command voltage ($V_{ds\_out}^{s*}$ and $V_{qs\_out}^{s*}$) in steady state. When the voltage magnitude is larger than $$\frac{1}{\sqrt{3}}V_{dc},$$

the PWM inverter 104 can not synthesize the instantaneous phase and magnitude of the command voltage due to its physical limitations. However, the fundamental component of the PWM output voltage will be the same as the command voltage, owing to the function of the overmodulation process. There are many overmodulation methods, which realize the fundamental component of the commanded voltage up to six-step PWM.

The outputs of overmodulation processor 134 are coupled to an inverse transformation processor 136. Inverse transformation processor 136 converts a stationary frame representation of a rotating voltage command from the overmodulation processor 134 into a three phase sinusoid notation of the voltage command as follows.

$$\begin{bmatrix} v_{as}^* \\ v_{bs}^* \\ v_{cs}^* \end{bmatrix} = T(0)^{-1} \begin{bmatrix} v_{ds\_ov}^{s*} \\ v_{qs\_ov}^{s*} \end{bmatrix} = \begin{bmatrix} 1 & 0 \\ -\frac{1}{2} & +\frac{\sqrt{3}}{2} \\ -\frac{1}{2} & -\frac{\sqrt{3}}{2} \end{bmatrix} \begin{bmatrix} v_{ds\_ov}^{s*} \\ v_{qs\_ov}^{s*} \end{bmatrix} \quad (3)$$

The outputs of inverse transformation processor 136 are coupled to PWM inverter 104, which drives AC motor 102.

Figure 2:
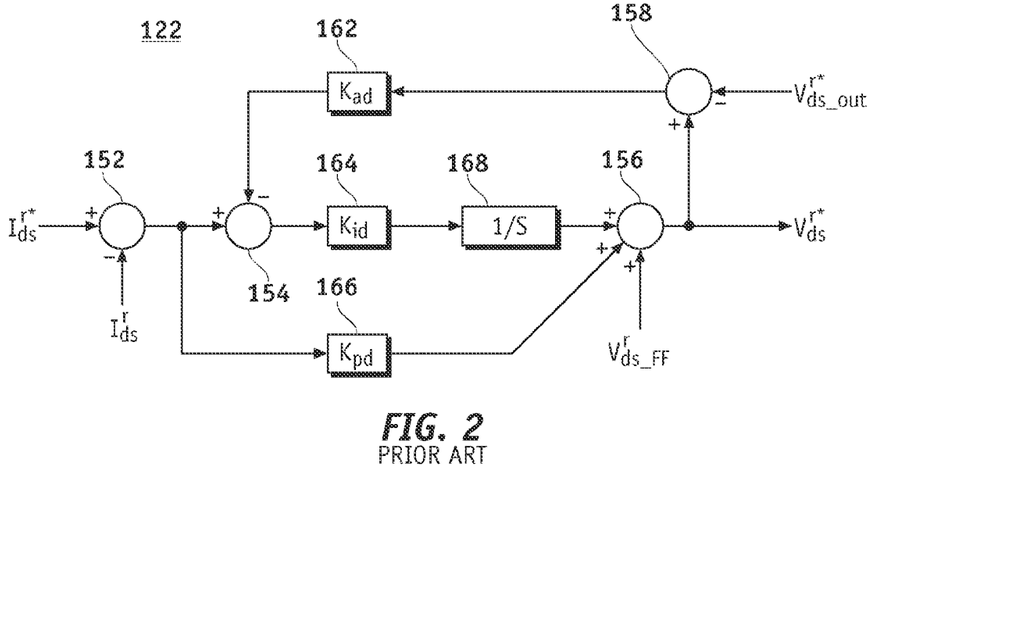
FIG. 2 is a schematic representation of a known synchronous frame regulator with an anti-windup feature.

FIG. 2 depicts an example of d-axis PI regulator 122. The q-axis PI regulator 124 operates in the same way. In FIG. 2, PI regulator 122 includes four summation points (reference numbers 152, 154, 156, and 158), three multiplier constants (reference numbers 162, 164, and 166), and an integrator 168. Summation point 152 forms the d-axis current error ($i_{ds\_err}^{r}$) as a difference between the commanded d current ($i_{ds}^{r*}$) and the measured d current ($i_{ds}^{r}$). The d-axis current error ($i_{ds\_err}^{r}$) from the difference output of summation point 152 is multiplied by the proportional gain constant ($K_{pd}$) at 166, and the multiplied value is one of three values summed at summation point 156. The voltage command ($V_{ds}^{r*}$), output from summation point 156, will minimize the current error ($i_{ds\_err}^{r}$) and is input into command voltage limiter 116. The d-axis output of command voltage limiter 116, depicted in FIG. 1, is subtracted at summation point 158 from the voltage command ($V_{ds}^{r*}$). The voltage difference output of summation point 158 is multiplied at element 162 by the anti-windup gain ($K_{ad}$), and the multiplied value is subtracted from the d-axis current error ($i_{ds\_err}^{r}$) at summation point 154. The difference output of summation point 154 is multiplied at element 164 by the integral gain ($K_{id}$), the multiplied value is integrated by integrator 168, and the integrated value output from integrator 168 is another of the three values summed at summation point 156. The output of the current regulator (i.e., the integrated value output from integrator 168 and the output of summation point 152 scaled by the proportional gain constant ($K_{pd}$) at element 166) are added to the feed-forward voltage ($V_{ds\_FF}^{r}$) at summation point 156 to generate the voltage command ($V_{ds}^{r*}$).

Figure 3:
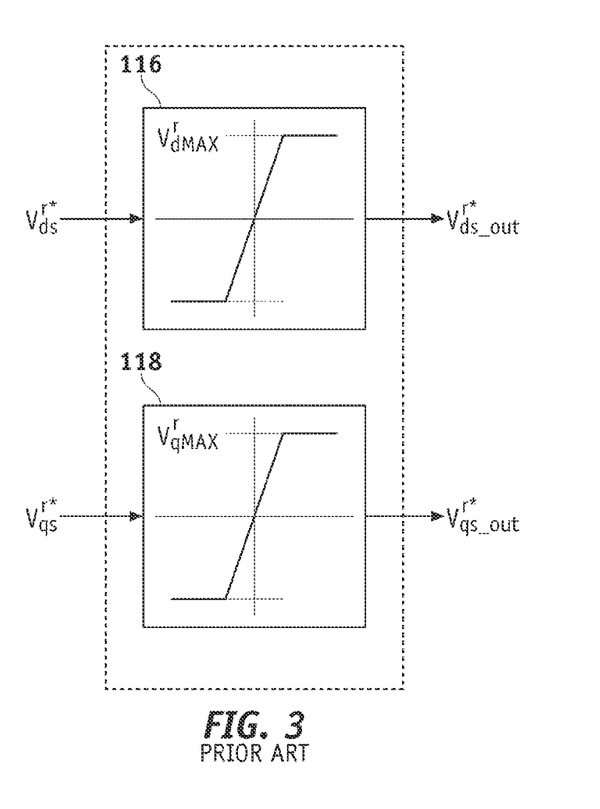
FIG. 3 is a block diagram of a known command limiter arrangement.

FIG. 3 is a schematic representation of command voltage limiters 116/118. In FIG. 3, the command voltage limiters 116/118 are two separate but identical voltage limiters that serve to limit the respective input voltages ($V_{ds}^{r*}$ and $V_{qs}^{r*}$).

The command voltage output ($V_{ds\_out}^{r*}$ and $V_{qs\_out}^{r*}$) of each limiter 116/118 is limited between $\pm V_{dMAX}^{r}$ and $\pm V_{qMAX}^{r}$, respectively.

In known systems, the current regulation performance degrades when the inverter operates with the overmodulation processor beyond the linear PWM area, discussed above. This degradation is because the instantaneous output voltage of the current regulator is modified by the overmodulation processor to be constrained within the physical limitation of the inverter. When a current error is caused by this voltage constraint, the integrator of the PI regulator is subject to saturation, and the saturation produces a large overshoot or undershoot. This is called the windup phenomena of the PI regulator. The role of anti-windup control is to prevent the windup phenomena during the voltage clamping. When the output voltage is clamped frequently, the anti-windup control is very important to prevent windup of the PI regulator and to maintain current control performance.

BRIEF SUMMARY

The techniques and technologies described herein provide an anti-windup process for a synchronous frame current regulator of a pulse width modulation inverter that drives an AC motor. The anti-windup process is implemented in conjunction with a circular voltage limiter that limits the voltage magnitude component of a command voltage d-q frame to the maximum fundamental voltage of the inverter.

One embodiment includes a control architecture for an electric motor controller. The control architecture includes: a Cartesian-to-polar converter configured to receive a synchronous frame d-axis command voltage ($V_{ds}^{r*}$) and a synchronous frame q-axis command voltage ($V_{qs}^{r*}$), and configured to provide a magnitude coordinate and a phase coordinate in response to $V_{ds}^{r*}$ and $V_{qs}^{r*}$; a magnitude limiter configured to process the magnitude coordinate, to generate a limited magnitude if the magnitude coordinate exceeds a threshold value, and to provide the magnitude coordinate or the limited magnitude as an output magnitude; and a polar-to-Cartesian converter configured to process the output magnitude and the phase coordinate, and to generate a clamped synchronous frame d-axis command voltage ($V_{ds\_out}^{r*}$) and a clamped synchronous frame q-axis command voltage ($V_{qs\_out}^{r*}$) based upon the output magnitude and the phase coordinate.

Another embodiment performs a method of controlling commands for an inverter of an electric motor. The method involves: obtaining a synchronous frame d-axis command voltage ($V_{ds}^{r*}$) and a synchronous frame q-axis command voltage ($V_{qs}^{r*}$) corresponding to a commanded condition for the inverter; applying a circular voltage limit, which represents a maximum fundamental voltage of the inverter, in response to $V_{ds}^{r*}$ and $V_{qs}^{r*}$; performing anti-windup control if a fundamental voltage component for $V_{ds}^{r*}$ and $V_{qs}^{r*}$, exceeds the maximum fundamental voltage of the inverter; and ignoring instantaneous voltage saturation if the fundamental voltage component for $V_{ds}^{r*}$ and $V_{qs}^{r*}$ does not exceed the maximum fundamental voltage of the inverter.

Another embodiment is represented by a control architecture for an inverter of an electric motor. The control architecture includes a transformation processor configured to generate a synchronous d-q frame from multiphase currents of the inverter, and a synchronous frame current regulator coupled to the transformation processor, the synchronous frame current regulator being configured to generate a first command voltage ($V_{ds}^{r*}$) and a second command voltage ($V_{qs}^{r*}$) from the synchronous d-q frame and in response to a commanded condition for the inverter. The control architecture also includes a circular voltage limiter coupled to the synchronous frame current regulator. The circular voltage limiter is configured to: process $V_{ds}^{r*}$ and $V_{qs}^{r*}$; limit a voltage magnitude component of $V_{ds}^{r*}$ and $V_{qs}^{r*}$ such that the voltage magnitude component does not exceed a maximum fundamental voltage of the inverter; and generate a first clamped command voltage ($V_{ds\_out}^{r*}$) and a second clamped command voltage ($V_{qs\_out}^{r*}$) as outputs. The control architecture also includes an anti-windup feedback arrangement coupled between the circular voltage limiter and the synchronous frame current regulator.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of electric motor applications and that the system described herein is merely one example embodiment of the invention.

For the sake of brevity, conventional techniques related to AC motors, AC motor control schemes, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 4:
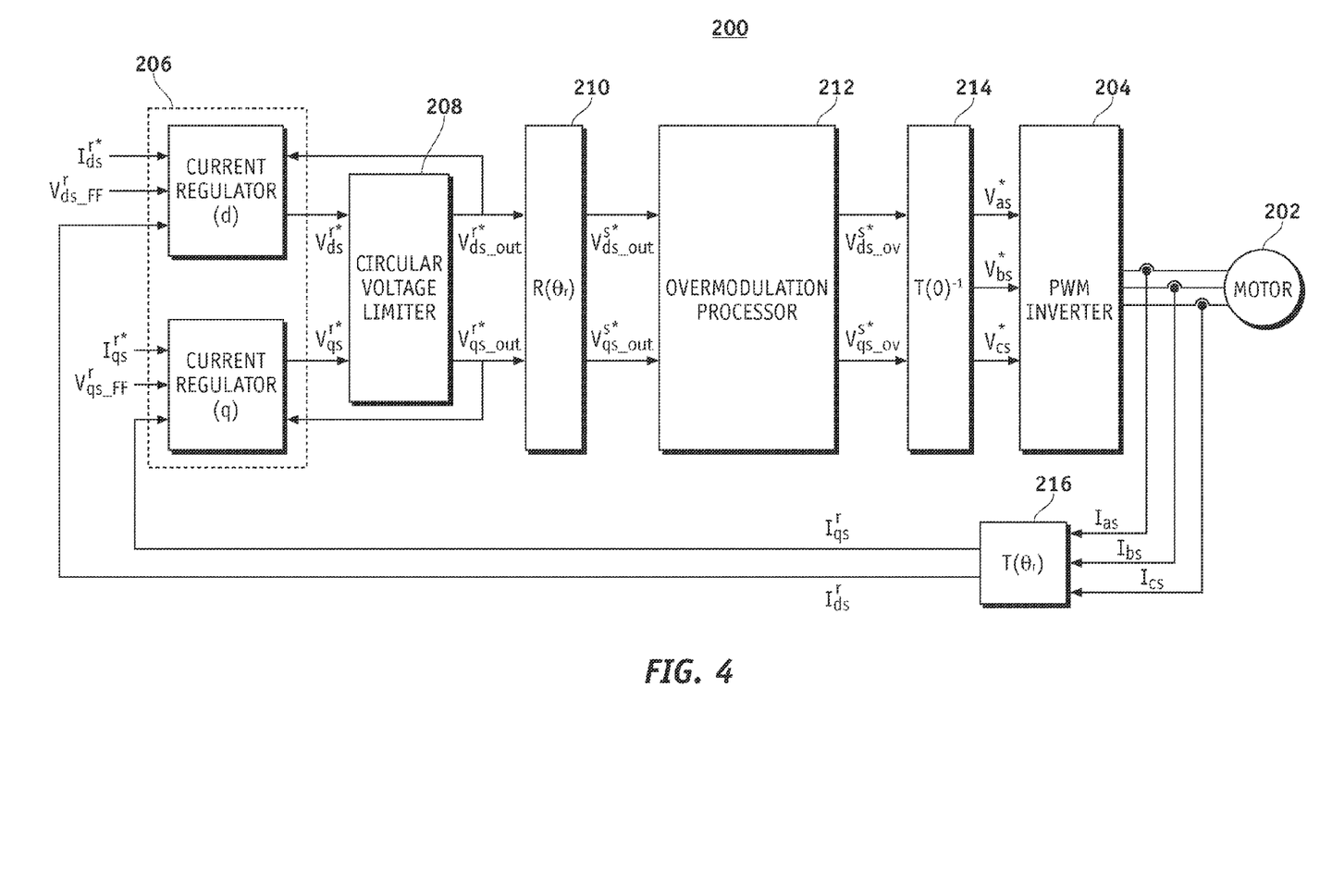
FIG. 4 is a schematic representation of a current regulator and control architecture for a multiphase AC motor.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 4 depicts one example arrangement of elements, additional intervening elements, devices, features, or components may be present in an embodiment of the invention.

A conventional anti-windup system, which is activated instantaneously when the output voltage is clamped, works well when the voltage is clamped for a brief time during a transient condition. However, it has been discovered that, when the current controller is operating near the maximum limits, the controller is continuously in the overmodulation range (including six-step PWM), and the output voltage of the current regulator is modified and clamped by the overmodulation processor for protracted times. Thus, the conventional anti-windup system does not provide good performance.

In the embodiments described below, a new anti-windup process works with overmodulation methods which are designed to realize the fundamental component of the commanded voltage. In contrast to the conventional methods, the new anti-windup control technique ignores instantaneous voltage saturation as long as the fundamental component is realized. This anti-windup system is activated only when the fundamental voltage command exceeds the realizable limit of the inverter. The difference between conventional techniques and the new technique is prominent when the magnitude of the current controller output voltage is larger than $$\frac{1}{\sqrt{3}}V_{dc}.$$

In that case, the output voltage is clamped by the (theoretical) hexagonal voltage limit, which is the physical limitation of inverter, six times per each cycle. The conventional anti-windup control will be activated every time the voltage is modified by overmodulation. The frequent operation of anti-windup loop degrades the performance of the current regulator. However, the proposed anti-windup technique is not activated as long as the fundamental component is synthesized by the overmodulation processor and the fundamental voltage magnitude is less than the predetermined value.

FIG. 4 is a schematic representation of a current regulator and control architecture 200 for a multiphase AC motor 202. Control architecture 200 is suitably configured to control commands for an inverter 204 (e.g., a PWM inverter) that drives AC motor 202. In practice, control architecture 200 may be utilized in an electric motor controller coupled to AC motor 202. Control architecture 200 generally includes, without limitation: a synchronous frame current regulator 206; a circular voltage limiter 208 coupled to the outputs of synchronous frame current regulator 206; a rotational transformation processor 210 coupled to the outputs of circular voltage limiter 208; an overmodulation processor 212 coupled to the outputs of rotational transformation processor 210; an inverse transformation processor 214 coupled to the outputs of overmodulation processor 212; and a transformation processor 216 coupled to the outputs of PWM inverter 204. In this embodiment, PWM inverter 204 is coupled to the outputs of transformation processor 216, and synchronous frame current regulator 206 is coupled to the outputs of transformation processor 216. Control architecture 200 may include some of the elements, components, and features discussed with respect to FIG. 1, and such common elements, components, and features will not be redundantly described in detail here. Notably, control architecture 200 employs circular voltage limiter 208 in lieu of separate command voltage limiters 116/118 as shown in FIG. 1. Moreover, the clamped command voltages ($V_{ds\_out}^{r*}$ and $V_{qs\_out}^{r*}$) output from circular voltage limiter 208 are produced by an entirely different process.

In operation, transformation processor 216 receives the multiphase currents ($i_{as}$, $i_{bs}$, and $i_{cs}$) of PWM inverter 204 and generates synchronous d-q frames corresponding to the multiphase currents. The synchronous d-q frame output by transformation processor 216 is represented by a measured d-axis current ($i_{ds}^{r}$) and a measured q-axis current ($i_{qs}^{r}$). The synchronous d-q frame output generated by transformation processor 216 serves as an input to synchronous frame current regulator 206, which also receives d-axis and q-axis command currents ($i_{ds}^{r*}$ and $i_{qs}^{r*}$) as inputs. These command currents represent a commanded condition for PWM inverter 204, and these command currents may be realized as synchronous d-q command frames. In this embodiment, synchronous frame current regulator 206 also receives feed forward voltages ($V_{ds\_FF}^{r}$ and $V_{qs\_FF}^{r}$) as inputs.

Synchronous frame current regulator 206 is suitably configured to generate a first command voltage (e.g., the d-axis command voltage, $V_{ds}^{r*}$) and a second command voltage (e.g., the q-axis command voltage, $V_{qs}^{r*}$) from the synchronous d-q frame and in response to the commanded condition for PWM inverter 204. In this regard, synchronous frame current regulator 206 may serve as a command source that generates $V_{ds}^{r*}$ and $V_{qs}^{r*}$. In practice, synchronous frame current regulation is performed in response to the d-q current frames output by transformation processor 216 and in response to the d-q command frames that represent the desired command conditions for PWM inverter 204. As described in more detail herein, synchronous frame current regulator 206 may also be influenced by the outputs of circular voltage limiter 208; these outputs are fed back to synchronous frame current regulator 206.

Circular voltage limiter 208 receives $V_{ds}^{r*}$ and $V_{qs}^{r*}$ from synchronous frame current regulator 206, and processes $V_{ds}^{r*}$ and $V_{qs}^{r*}$ in a suitable manner. For example, circular voltage limiter 208 can limit a voltage magnitude component of $V_{ds}^{r*}$ and $V_{qs}^{r*}$ such that the voltage magnitude component does not exceed the maximum fundamental voltage of PWM inverter 204. In this regard, circular voltage limiter 208 may apply a circular voltage limit, which represents the maximum fundamental voltage of PWM inverter 204, to effectively reduce the voltage magnitude component such that it does not exceed a predetermined threshold value. In one embodiment, circular voltage limiter 208 approximates the hexagon formed by the switching state vectors associated with a three-phase, two-level inverter.

In addition to the voltage magnitude component, $V_{ds}^{r*}$ and $V_{qs}^{r*}$ have a phase component. In one embodiment, if the voltage magnitude component exceeds the maximum fundamental voltage of PWM inverter 204, circular voltage limiter 208 reduces the voltage magnitude component and maintains the phase component, and if the voltage magnitude component does not exceed the maximum fundamental voltage of PWM inverter 204, circular voltage limiter 208 maintains both the voltage magnitude component and the phase component.

Circular voltage limiter 208 generates a first clamped command voltage (e.g., a d-axis voltage, $V_{ds\_out}^{r*}$) and a second clamped command voltage (e.g., a q-axis voltage, $V_{qs\_out}^{r*}$) as outputs. As depicted in FIG. 4, these outputs are fed back to synchronous frame current regulator 206. Synchronous frame current regulator 206 may be generally configured as described above, and it may utilize the arrangement illustrated in FIG. 2.

Referring to FIG. 2, the outputs of circular voltage limiter 208 may feed an anti-windup arrangement for control architecture 200, where the anti-windup arrangement is coupled between circular voltage limiter 208 and synchronous frame current regulator 206 (the anti-windup arrangement may be considered to be part of synchronous frame current regulator 206). For this example, summation point 158 and anti-windup gain element 162 represent the portion of the anti-windup feedback arrangement for the d-axis processing; an equivalent portion is used for the q-axis processing. The anti-windup feedback arrangement derives one error signal from $V_{ds}^{r*}$ and $V_{ds\_out}^{r*}$ and another error signal from $V_{qs}^{r*}$ and $V_{qs\_out}^{r*}$. For example, summation point 158 generates an error signal from $V_{ds}^{r*}$ and $V_{ds\_out}^{r*}$ as an output, and that error signal is processed by anti-windup gain element 162. In control architecture 200, the anti-windup feedback arrangement performs anti-windup control if the voltage magnitude component of $V_{ds}^{r*}$ and $V_{qs}^{r*}$ exceeds the maximum fundamental voltage of PWM inverter 204. On the other hand, the anti-windup feedback arrangement disregards or ignores instantaneous voltage saturation if the voltage magnitude component does not exceed the maximum fundamental voltage of PWM inverter 204.

Rotational transformation processor 210, which is coupled to circular voltage limiter 208, is suitably configured to rotate and transform $V_{ds\_out}^{r*}$ into a first stationary voltage command (e.g., the stationary d-axis command voltage, $V_{ds\_out}^{s*}$), and to rotate and transform $V_{qs\_out}^{r*}$ into a second stationary voltage command (e.g., the stationary q-axis command voltage, $V_{qs\_out}^{s*}$). Overmodulation processor 212 receives $V_{ds\_out}^{s*}$ and $V_{qs\_out}^{s*}$ from rotational transformation processor 210. Overmodulation processor 212 is suitably configured to realize a fundamental component of $V_{ds\_out}^{r*}$ and $V_{qs\_out}^{r*}$ in response to $V_{ds\_out}^{s*}$ and $V_{qs\_out}^{s*}$. In practice, overmodulation processor 212 can perform overmodulation on $V_{ds\_out}^{s*}$ and $V_{qs\_out}^{s*}$ to realize the fundamental voltage component for $V_{ds}^{r*}$ and $V_{qs}^{r*}$ up to the maximum fundamental voltage of PWM inverter 204.

In one embodiment, overmodulation processor 212 is suitably configured to generate a first modified voltage (e.g., the d-axis voltage, $V_{ds\_ov}^{s*}$) having a fundamental component with magnitude and phase that matches those of $V_{ds\_out}^{s*}$ in steady state. Moreover, overmodulation processor 212 is suitably configured to generate a second modified voltage (e.g., the q-axis voltage, $V_{qs\_ov}^{s*}$) having a fundamental component with magnitude and phase that matches those of $V_{qs\_out}^{s*}$ in steady state. Overmodulation processor 212 functions to preserve the voltage linearity of the motor controller by keeping the limited voltage commands within the hexagonal vector space. These modified d-q voltages serve as inputs to inverse transformation processor 214. In this embodiment, inverse transformation processor 214 is configured to convert $V_{ds\_ov}^{s*}$ and $V_{qs\_ov}^{s*}$ into multiphase sinusoid notation for PWM inverter 204. For the three-phase embodiment described herein, inverse transformation processor 214 generates three command voltage outputs, $V_{as}^*$, $V_{bs}^*$, and $V_{cs}^*$.

Figure 5:
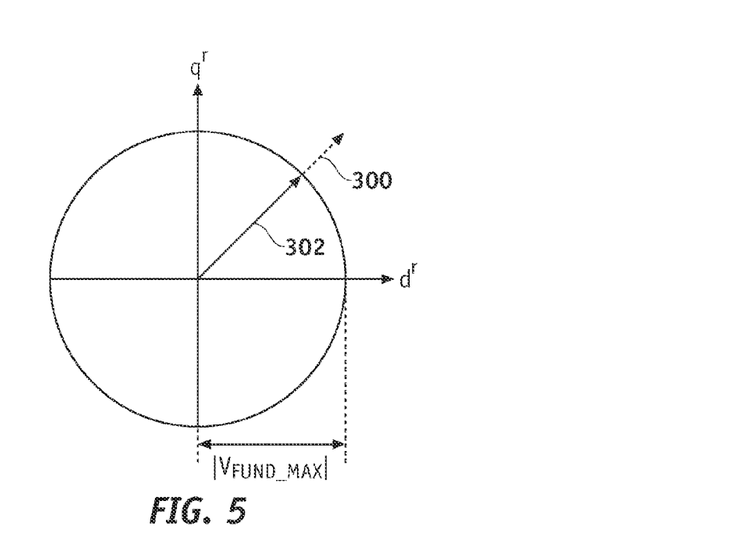
FIG. 5 is a diagram that illustrates the functionality of a circular voltage limiter suitable for use with the architecture shown in FIG. 4.

FIG. 5 is a diagram that illustrates the functionality of a circular voltage limiter, such as circular voltage limiter 208 in FIG. 4. This diagram schematically illustrates the manner in which the circular voltage limiter functions to limit the voltage magnitude component corresponding to $V_{ds}^{r*}$ and $V_{qs}^{r*}$. The horizontal axis in FIG. 5 corresponds to the d-axis component, and the vertical axis in FIG. 5 corresponds to the q-axis component. The radius of the circle in FIG. 5 represents the maximum voltage magnitude allowed by the circular voltage limiter. As described above, this maximum magnitude corresponds to the maximum fundamental voltage ($V_{fund\_max}$) of the PWM inverter.

The dashed arrow 300 represents a voltage magnitude component of $V_{ds}^{r*}$ and $V_{qs}^{r*}$ that exceeds the maximum allowable magnitude. Under this condition, the circular voltage limiter reduces the magnitude component to a magnitude that does not exceed the maximum allowable magnitude. The solid arrow 302 represents the limited magnitude. For this example, the limited magnitude 302 equals the maximum allowable magnitude. As described in more detail below, the circular voltage limiter is suitably configured to process this limited magnitude 302 to generate $V_{ds\_out}^{r*}$ and $V_{qs\_out}^{r*}$.

Figure 6:
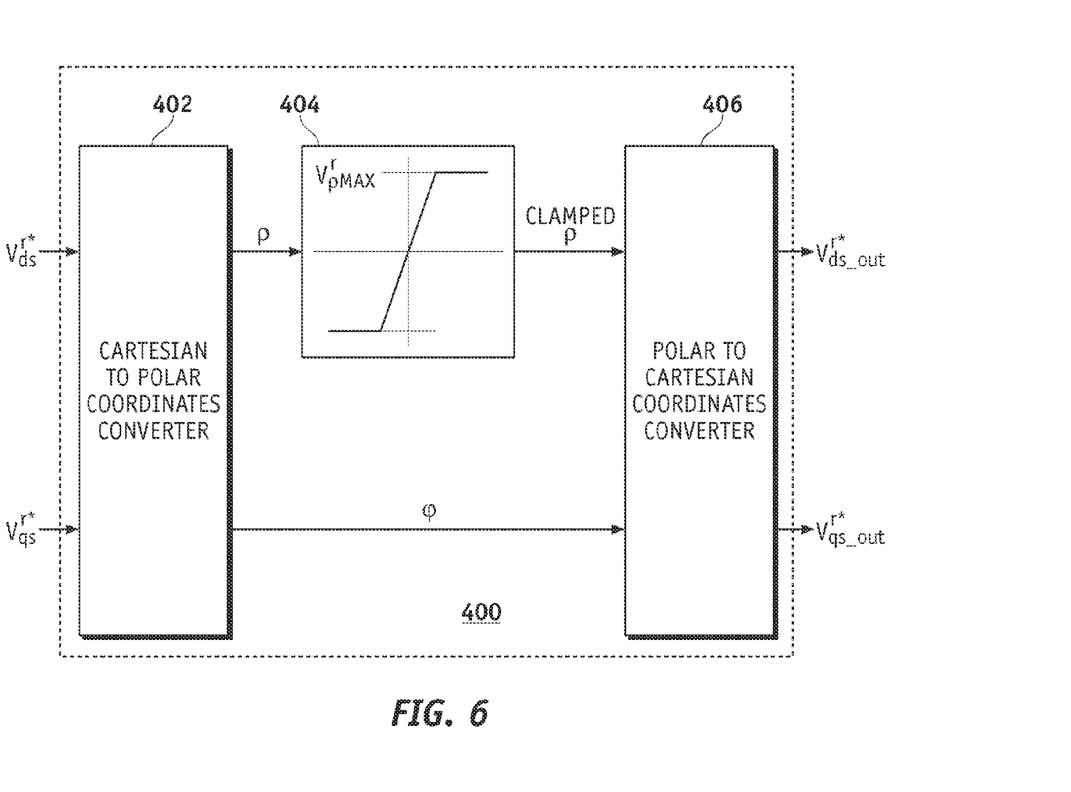
FIG. 6 is a schematic representation of a command limiter suitable for use with the architecture shown in FIG. 4.

FIG. 6 is a schematic representation of a circular voltage limiter 400 suitable for use with the architecture shown in FIG. 4. As depicted in FIG. 6, circular voltage limiter 400 includes a Cartesian-to-polar coordinates converter 402, a polar range limiter (magnitude limiter) 404, and a polar-to-Cartesian coordinates converter 406. The command output voltages $V_{ds}^{r*}$ and $V_{qs}^{r*}$ from synchronous frame current regulator 206, initially expressed in Cartesian coordinates d and q, are converted to polar coordinates ρ (magnitude) and φ (phase) in converter 402. Next, only the p coordinate is limited (i.e., clamped) if necessary in limiter 404. The value of the limiter can range from zero to $$\frac{2}{\pi} V_{dc},$$

which is the maximum fundamental component of six-step mode. As mentioned above, limiter 404 generates a limited magnitude if the magnitude coordinate exceeds this maximum threshold value, and limiter 404 provides the magnitude coordinate or the limited magnitude as an output magnitude (e.g., a clamped ρ coordinate). Finally, the clamped ρ coordinate and the unprocessed φ coordinate are re-converted from polar coordinates to Cartesian coordinates in converter 406. In practice, converter 406 is suitably configured to generate a clamped synchronous frame d-axis command voltage ($V_{ds\_out}^{r*}$) and a clamped synchronous frame q-axis command voltage ($V_{qs\_out}^{r*}$) based upon the clamped ρ coordinate and the maintained φ coordinate.

For the embodiment shown in FIG. 4, Cartesian-to-polar converter 402 is coupled to synchronous frame current regulator 206, and polar-to-Cartesian converter 406 is coupled to rotational transformation processor 210.

Referring again to FIG. 4, PWM inverter 204 is formed conventionally with physical components, typically including IGBT switches, or any suitable equivalent. AC motor 202 is also a physical component. In embodiments of the invention, transformation processor 216 and inverse transformation processor 214 are implemented in software. In practice, control architecture 200 may employ hardware interface components (e.g., analog circuits and an analog-to-digital converter) that reads the currents $i_{as}$, $i_{bs}$, and $i_{cs}$. Similarly, control architecture 200 may employ hardware interface components (e.g., digital circuits and a counter) between inverse transformation processor 214 and PWM inverter 204, where such components generate the pulse trains in response to $V_{as}^*$, $V_{bs}^*$, and $V_{cs}^*$. Other elements depicted in FIG. 4 are embodied in a processor controlled by computer-executable software. The processor executes software having instructions to control the processor to perform each of the functions described above. Although 10,000 iterations per second might be regarded as a typical cycle rate for performing the described calculation, the iteration rate could be more or less than 10,000 cycles per second. The processor itself may be a microprocessor, part of another processor, or any equivalent. Equivalents includes application specific integrated circuits (ASICs), programmable gate arrays (PGAs), discrete components configured to perform the functions or the like.

In another embodiment, a method includes converting commands from Cartesian coordinates to polar coordinates having a magnitude and an angle. The method further includes limiting the magnitude to a predetermined value to provide a limited magnitude and converting the limited magnitude and the angle coordinate to Cartesian coordinates.

In yet another embodiment, a processor readable medium includes instructions for a processor to convert commands from Cartesian coordinates to polar coordinates having a magnitude and an angle. The processor readable medium further includes instructions for the processor to limit the magnitude to a predetermined value and provide a limited magnitude and instructions for the processor to convert the limited magnitude and the angle coordinate to Cartesian coordinates.

It should be appreciated that the techniques and technologies described herein can be equivalently implemented in a control architecture that includes a different type of synchronous frame current regulator. For example, the circular voltage limiting and anti-windup techniques described above can be utilized in the context of a control architecture that employs a complex vector current regulator.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A control architecture for an electric motor controller, the control architecture comprising:

a Cartesian-to-polar converter configured to receive a synchronous frame d-axis command voltage ($V_{ds}^{r*}$) and a synchronous frame q-axis command voltage ($V_{qs}^{r*}$), and to provide a magnitude coordinate and a phase coordinate in response to $V_{ds}^{r*}$ and $V_{qs}^{r*}$;

a magnitude limiter configured to process the magnitude coordinate, to generate a limited magnitude if the magnitude coordinate exceeds a threshold value, and to provide the magnitude coordinate or the limited magnitude as an output magnitude; and a polar-to-Cartesian converter configured to process the output magnitude and the phase coordinate, and to generate a clamped synchronous frame d-axis command voltage ($V_{ds\_out}{}^{r*}$) and a clamped synchronous frame q-axis command voltage ($V_{qs\_out}{}^{r*}$) based upon the output magnitude and the phase coordinate.

2. A control architecture according to claim 1, further comprising an overmodulation processor coupled to outputs of the polar-to-Cartesian converter, the overmodulation processor being configured to realize a fundamental component of $V_{ds}{}^{r*}$ and $V_{qs}{}^{r*}$.

3. A control architecture according to claim 2, further comprising a rotational transformation processor coupled between the polar-to-Cartesian converter and the overmodulation processor, the rotational transformation processor being configured to:
transform $V_{ds\_out}{}^{r*}$ into a stationary frame command voltage ($V_{ds\_out}{}^{s*}$); and
transform $V_{qs\_out}{}^{r*}$ into a stationary frame command voltage ($V_{qs\_out}{}^{s*}$).

4. A control architecture according to claim 1, further comprising a synchronous frame current regulator coupled to the Cartesian-to-polar converter, wherein the synchronous frame current regulator serves as a command source that generates $V_{ds}{}^{r*}$ and $V_{qs}{}^{r*}$ for the Cartesian-to-polar converter.

5. A control architecture according to claim 4, further comprising a transformation processor coupled to the synchronous frame current regulator, the transformation processor being configured to transform multiphase current measurements into synchronous d-q frame measurements.

6. A method of controlling commands for an inverter of an electric motor, the method comprising:
obtaining a synchronous frame d-axis command voltage ($V_{ds}{}^{r*}$) and a synchronous frame q-axis command voltage ($V_{qs}{}^{r*}$) corresponding to a commanded condition for the inverter;
applying a circular voltage limit, which represents a maximum fundamental voltage of the inverter, in response to $V_{ds}{}^{r*}$ and $V_{qs}{}^{r*}$
performing anti-windup control if a fundamental voltage component for $V_{ds}{}^{r*}$ and $V_{qs}{}^{r*}$ exceeds the maximum fundamental voltage of the inverter; and
ignoring instantaneous voltage saturation if the fundamental voltage component for $V_{ds}{}^{r*}$ and $V_{qs}{}^{r*}$ does not exceed the maximum fundamental voltage of the inverter; wherein
applying the circular voltage limit comprises:
converting $V_{ds}{}^{r*}$ and $V_{qs}{}^{r*}$ from Cartesian coordinates to polar coordinates having a magnitude coordinate and a phase coordinate;
limiting the magnitude coordinate to generate a limited magnitude; and
converting the limited magnitude and the phase coordinate to Cartesian coordinates that represent a clamped synchronous frame d-axis command voltage ($V_{ds\_out}{}^{r*}$) and a clamped synchronous frame cl-axis command voltage ($V_{qs\_out}{}^{r*}$).

7. A method according to claim 6, further comprising performing rotational transformation of $V_{ds\_out}{}^{r*}$ and $V_{qs\_out}{}^{r*}$ to produce a stationary d-axis command voltage ($V_{ds\_out}{}^{s*}$) and a stationary q-axis command voltage ($V_{qs\_out}{}^{s*}$).

8. A method according to claim 7, further comprising performing overmodulation on $V_{ds\_out}{}^{s*}$ and $V_{qs\_out}{}^{r*}$ to realize the fundamental voltage component for $V_{ds}{}^{r*}$ and $V_{qs}{}^{r*}$ up to the maximum fundamental voltage of the inverter.

9. A method according to claim 6, wherein limiting the magnitude coordinate comprises reducing the magnitude coordinate such that it does not exceed the maximum fundamental voltage of the inverter.

10. A method according to claim 6, further comprising
generating synchronous d-q current frames from multiphase currents of the inverter;
obtaining synchronous d-q command frames corresponding to the commanded condition for the inverter; and
performing synchronous frame current regulation in response to the synchronous d-q current frames and the synchronous d-q command frames; wherein the synchronous frame current regulation produces $V_{ds}{}^{r*}$ and $V_{qs}{}^{r*}$.

11. A control architecture for an inverter of an electric motor, the control architecture comprising:
a transformation processor configured to generate a synchronous d-q frame from multiphase currents of the inverter;
a synchronous frame current regulator coupled to the transformation processor, the synchronous frame current regulator being configured to generate a first command voltage ($V_{ds}{}^{r*}$) and a second command voltage ($V_{qs}{}^{r*}$) from the synchronous d-q frame and in response to a commanded condition for the inverter;
a circular voltage limiter coupled to the synchronous frame current regulator, the circular voltage limiter being configured to:
process $V_{ds}{}^{r*}$ and $V_{qs}{}^{r*}$;
limit a voltage magnitude component of $V_{ds}{}^{r*}$ and $V_{qs}{}^{r*}$ such that the voltage magnitude component does not exceed a maximum fundamental voltage of the inverter; and
generate a first clamped command voltage ($V_{ds\_out}{}^{r*}$) and a second clamped command voltage ($V_{qs\_out}{}^{r*}$) as outputs; and
an anti-windup feedback arrangement coupled between the circular voltage limiter and the synchronous frame current wherein:
$V_{ds}{}^{r*}$ and $V_{qs}{}^{r*}$ have a phase component
if the voltage magnitude component exceeds the maximum fundamental voltage of the inverter, the circular voltage limiter reduces the voltage magnitude component and maintains the phase component; and
if the voltage magnitude component does not exceed the maximum fundamental voltage of the inverter, the circular voltage limiter maintains both the voltage magnitude component and the phase component.

12. A control architecture according to claim 11, wherein the anti windup feedback arrangement comprises:
a first anti-windup feedback path having a first anti-windup gain element for a first error signal derived from $V_{ds}{}^{r*}$ and $V_{ds\_out}{}^{r*}$; and
a second anti-windup feedback path having a second anti-windup gain element for a second error signal derived from $V_{qs}{}^{r*}$ and $V_{qs\_out}{}^{r*}$.

13. A control architecture according to claim 11, further comprising a rotational transformation processor coupled to the circular voltage limiter, the rotational transformation processor being configured to:
transform $V_{ds\_out}{}^{r*}$ into a first stationary voltage command ($V_{ds\_out\,s*}$); and
transform $V_{qs\_out}{}^{r*}$ into a second stationary voltage command ($V_{qs\_out}{}^{s*}$).

14. A control architecture according to claim 13, further comprising an overmodulation processor coupled to the rotational transformation processor, the overmodulation processor being configured to:

receive $V_{ds\_out}{}^{s*}$ and $V_{ds\_out}{}^{s*}$ from the rotational transformation processor; and realize a fundamental component of $V_{ds\_out}{}^{r*}$ and $V_{qs\_out\,s*}$ in response to $V_{ds\_out}{}^{s*}$ and $V_{qs\_out}{}^{s*}$.

15. A control architecture according to claim 14, wherein:

the overmodulation processor is configured to generate a first modified voltage ($V_{ds\_hd\ ov}{}^{s*}$) having fundamental component magnitude and phase that matches those of $V_{ds\_out}{}^{s*}$ in steady state; and the overmodulation processor is configured to generate a second modified voltage ($V_{qs\_ov}{}^{s*}$) having fundamental component magnitude and phase that matches those of $V_{qs\_out}{}^{s*}$ in steady state.

16. A control architecture according to claim 15, further comprising an inverse transformation processor coupled to the overmodulation processor, the inverse transformation processor being configured to convert $V_{ds\_ov}{}^{s*}$ and $V_{qs\_ov}{}^{s*}$ into multiphase sinusoid notation for the inverter.

17. A control architecture according to claim 11, wherein the circular voltage limiter comprises:

a Cartesian to polar converter configured to receive $V_{ds}{}^{r*}$ and $V_{qs}{}^{r*}$, and to provide the voltage magnitude component and a phase component in response to $V_{ds}{}^{r*}$ and $V_{qs}{}^{r*}$;

a magnitude limiter configured to process the voltage magnitude component, to generate a limited magnitude if the voltage magnitude component exceeds the maximum fundamental voltage of the inverter, and to provide the voltage magnitude component or the limited magnitude as an output magnitude component; and a polar-to-Cartesian converter configured to process the output magnitude component and the phase component, and to generate $V_{ds\_out}{}^{r*}$ and $V_{qs\_out}{}^{r*}$ based upon the output magnitude component and the phase component.

18. A control architecture according to claim 11, wherein:

the anti-windup feedback arrangement performs anti-windup control if the voltage magnitude component exceeds the maximum fundamental voltage of the inverter; and the anti-windup feedback arrangement disregards instantaneous voltage saturation if the voltage magnitude component does not exceed the maximum fundamental voltage of the inverter.

* * * * *